HENRY C. COOK.

Improvement in Transplanter.

No. 127,150.             Patented May 28, 1872.

Scale.

Witnesses.
H. N. Foster
Benjamin Arnold

Inventor.
H. C. Cook 127,150

UNITED STATES PATENT OFFICE.

HENRY C. COOK, OF BRENHAM, TEXAS.

IMPROVEMENT IN TRANSPLANTERS.

Specification forming part of Letters Patent No. 127,150, dated May 28, 1872.

Specification describing certain Improvements in Cotton-Transplanters, invented by HENRY C. COOK, of Brenham, in the county of Washington and State of Texas.

This machine is intended for use in transplanting cotton or other plants; and the invention consists in constructing a cylindrical spade having a slot in each side, with a central ring having projections on two sides, extending through the slots in the cylinder, on which the feet of the operator are placed to facilitate the pushing out of the earth and plant from the cylinder.

Figure 1:
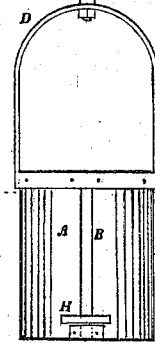
Figure 2:
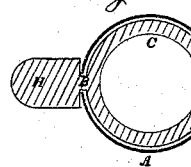
Figure 3:
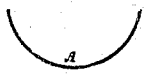

Figure 1 is a side elevation of the implement. Fig. 2 is a horizontal section taken through in direction of the dotted line $x\ x$. Fig. 3 is a bottom view of one-half of the cylinder.

A is a cylinder, made preferably of sheet-steel, and having a ring of thicker metal fastened to its upper edge for the purpose of strengthening it, and to fasten the ends of the bail D to. A slot, B, is made in each side of the cylinder A, which may be made wholly of one piece of metal and the slots cut out, or in two halves (one shown in Fig. 3) and fastened together, leaving the slots open. A ring, C, is made to go easily inside the cylinder A, and has on each side projections which extend out through the slots. These projections are spread out to form foot pieces H H. S is the rod attached to the bail D, and provided with a cross-handle similar to an auger to operate the implement by, which operation is as follows:

The cylinder A is forced into the earth, around the plant to be transplanted, by pressure on the cross-handle, or by pressing the rim with the foot, and then drawn up, taking with it the earth and plant, which are, with the cylinder, inserted into a hole previously made by the same tool, and the feet of the operator being placed one on each foot piece H H, the cylinder is easily drawn out by means of the cross-handle, the ring C holding the earth down in place.

I do not claim, broadly, a ring used within the cylinder of a transplanter operated by the feet; but What I do claim is—

The cylinder A, provided on opposite sides with slots B B, in combination with the ring C, the latter being provided with steps H H, connected with the ring through said slots so as to be kept in close proximity to the ground, substantially as described.

H. C. COOK.

Witnesses:
H. N. FOSTER,
BENJAMIN ARNOLD.